J. PFEIFLE.
ATTACHMENT FOR HARVESTERS.
APPLICATION FILED DEC. 12, 1910.
1,000,550.
Patented Aug. 15, 1911.
2 SHEETS—SHEET 2.
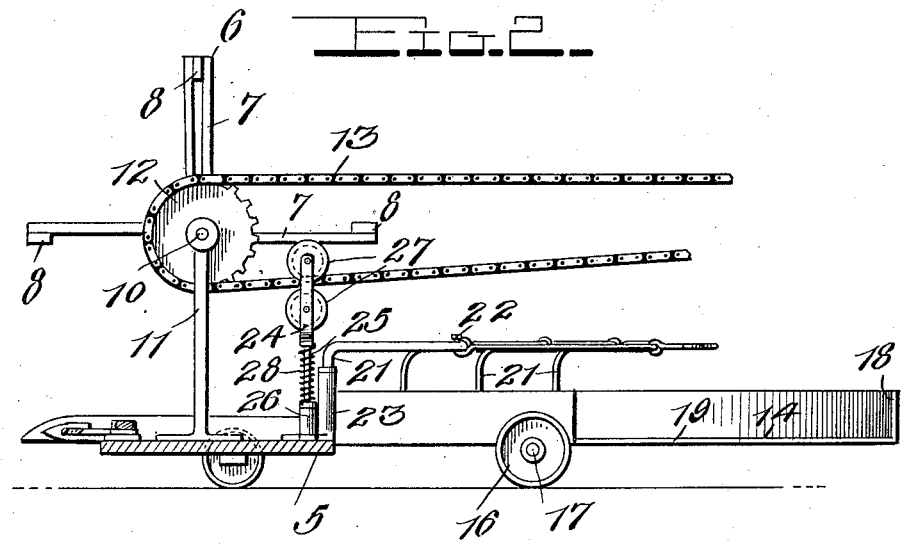
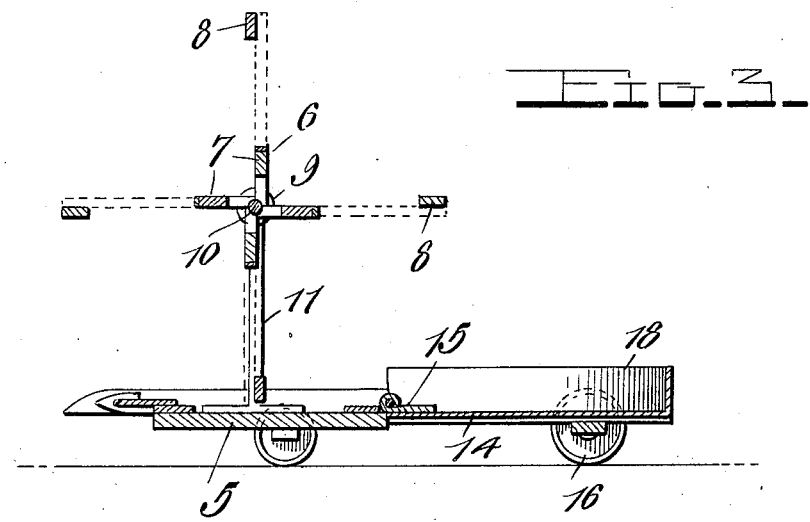
Witnesses
Chas. L. Griesbauer.
M. F. Reeder
Inventor
J. Pfeifle,
By Watson E. Coleman.
Attorney

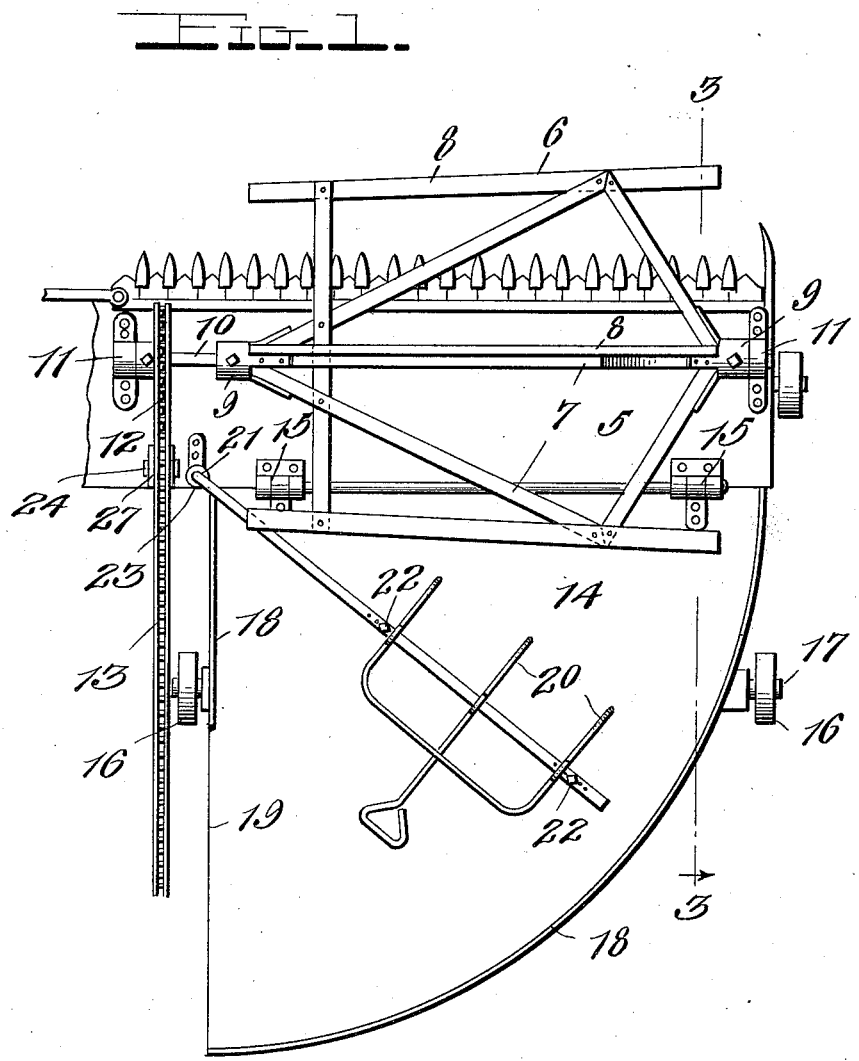

UNITED STATES PATENT OFFICE.

JOHN PFEIFLE, OF GOODRICH, NORTH DAKOTA.

ATTACHMENT FOR HARVESTERS.

1,000,550.  Specification of Letters Patent.  Patented Aug. 15, 1911.

Application filed December 12, 1910. Serial No. 596,797.

*To all whom it may concern:*

Be it known that I, JOHN PFEIFLE, a citizen of the United States, residing at Goodrich, in the county of Sheridan and State of North Dakota, have invented certain new and useful Improvements in Attachments for Harvesters, of which the following is a specification, reference being had to the accompanying drawings.

This invention relates to improvements in grain harvesting machines and has for its primary object to provide a machine of this character which is especially adapted for the cutting of short grain such as flax.

A further object of the invention resides in the provision of a platform hinged to the cutter bar and extending rearwardly of a reel mounted upon said bar, said reel being adapted to throw the cut grain on to the platform, and a rake movably mounted upon the platform for gathering the grain thereon into bundles.

With the above and other objects in view, the invention consists of the novel features of construction, combination and arrangement of parts hereinafter fully described and claimed and illustrated in the accompanying drawings, in which—

Figure 1 is a plan view of the cutter or mower bar of a harvester illustrating the application of my invention thereto; Fig. 2 is a side elevation; and Fig. 3 is a detail section taken on the line 3—3 of Fig. 1.

Referring more particularly to the drawings 5 designates the cutter bar of a grain harvesting machine which is suitably mounted and supported from a wheeled frame (not shown).

Upon the sickle bar 5 a reel 6 is revolubly mounted, said reel embodying a spider frame 7 and the arms 8 which are secured thereto. The ends of the frame 7 are rigidly fixed to the sleeves 9 which are mounted upon a shaft 10. The ends of the shaft 10 are supported in the upper ends of the standards 11 rigidly mounted upon the opposite ends of the sickle bar 5. Upon one end of this shaft a sprocket 12 is secured around which a drive chain 13 passes, said chain extending to a similar sprocket on the wheel axle of the machine, or any other desired source of power.

To the rear edge of the sickle bar 5 a platform 14 is attached by means of the hinges 15. This platform is mounted between the supporting wheels 16 which are mounted upon the ends of an axle 17 secured to the under side of the platform. The platform 14 is formed with a vertical flange 18 on its free edges, and at one side said flange is cut away to provide an opening 19 through which the grain may be removed from the platform.

In order to provide means for conveniently gathering the grain into bundles, a rake 20 is arranged for movement over said platform. This rake is removably mounted upon a pivoted rod 21, suitable set screws 22 being arranged in said rod to retain the rake thereon. One end of the rod 21 is bent at a right angle and disposed in a tubular standard 23 fixed upon the platform 14 adjacent to its hinged edge. This angular end of the rake supporting rod rotates in the tubular standard in the movement of the rake. The rake 20 is provided with a suitable handle so that it may be conveniently moved over the platform and between the arms of the reel to gather the cut grain and collect the same into bundles, said rake moving in an arc between the hinged edge of the platform and the opening 19 provided in the side flange 18 thereof.

In order to prevent slack in the driving chain 13, a tightening device 24 is arranged upon the sickle bar, said device consisting of a vertical supporting rod 25 and a tubular standard 26 arranged thereon. The upper end of this standard is bifurcated and has rotatably mounted therein the spaced rollers 27 between which the lower stretch of the drive chain is disposed. A coiled spring 28 is arranged upon the rod 25 and has one end secured to the lower end of the tubular standard 26. This spring normally acts to draw the standard downwardly upon the rod and thus take up any slack which may occur in the drive chain.

From the foregoing it is believed that the construction and operation of my improved harvesting machine will be readily understood. The device may be easily arranged upon harvesters of the present construction at but slight additional expense. The device is extremely efficient in practical operation and provides a machine for cutting flax and other short grain which could not be done with the ordinary binder. By movably mounting the platform 14, the same may move independently of the sickle bar, thus preventing injury to the various parts in the movement of the machine over undulating surfaces. The machine is also extremely strong and durable in practical use.

While I have shown and described the preferred construction and arrangement of the various parts, it will be understood that the invention is susceptible of considerable modification without departing from the essential feature or sacrificing any of the advantages thereof.

Having thus described the invention what is claimed is:—

The combination with a harvester including a sickle bar, of a reel revolubly mounted upon said sickle bar, a wheel supported platform hingedly connected to the sickle bar at one edge for movement independently thereof, a tubular standard secured to the sickle bar adjacent to said platform, a rod rotatably mounted in said standard having its upper end laterally extended and movable over said platform, and a rake longitudinally adjustable upon the lateral extension of said rod having a hand hold whereby the same may be moved over the platform to gather the grain thereon.

In testimony whereof I hereunto affix my signature in the presence of two witnesses.

JOHN PFEIFLE.

Witnesses:
 CARL MATZ,
 O. P. JORDAL.

---

Copies of this patent may be obtained for five cents each, by addressing the "Commissioner of Patents, Washington, D. C."